US012076849B2

(12) United States Patent
Liu

(10) Patent No.: US 12,076,849 B2
(45) Date of Patent: Sep. 3, 2024

(54) HEX WRENCH HOLDER STRUCTURE

(71) Applicant: Ningbo King Mount Co., Ltd., Ningbo (CN)

(72) Inventor: Kuan-Ting Liu, Taichung (TW)

(73) Assignee: NINGBO KING MOUNT CO., LTD., Ningbo (CN)

( * ) Notice: Subject to any disclaimer, the term of this patent is extended or adjusted under 35 U.S.C. 154(b) by 0 days.

(21) Appl. No.: 18/085,767

(22) Filed: Dec. 21, 2022

(65) Prior Publication Data

US 2024/0208038 A1 Jun. 27, 2024

(51) Int. Cl.
*B25H 3/00* (2006.01)

(52) U.S. Cl.
CPC .................................... *B25H 3/003* (2013.01)

(58) Field of Classification Search
CPC ................................ B25H 3/022; B25H 3/003
USPC ................................ 206/376, 377, 378, 379
See application file for complete search history.

(56) References Cited

U.S. PATENT DOCUMENTS 2,776,744 A 1/1957 Cook
6,044,985 A * 4/2000 Kao ....................... B25H 3/003 294/146
6,360,892 B1 * 3/2002 Chen ........................ B25H 3/04 211/70.6
6,401,923 B1 * 6/2002 Huang ..................... B25H 3/04 206/480
6,896,136 B2 * 5/2005 Hu ........................... B25H 3/04 206/378
8,276,767 B2 * 10/2012 Su .......................... B25H 3/003 211/70.6
2003/0141266 A1 * 7/2003 Lin .......................... B25H 3/04 211/70.6
2008/0314949 A1 * 12/2008 Wang ..................... B25H 3/003 224/666
2009/0001116 A1 * 1/2009 Meng ..................... B25H 3/003 224/666
2009/0242433 A1 * 10/2009 Van Bergen ........... B25H 3/003 206/234
2012/0043238 A1 * 2/2012 Christopher ........... B25H 3/003 206/375
2012/0138497 A1 * 6/2012 Lee .......................... B25H 3/04 206/376
2019/0367263 A1 * 12/2019 Chabot .............. B65D 90/0046

* cited by examiner

*Primary Examiner* — Ernesto A Grano
*Assistant Examiner* — Symren K Sanghera
(74) *Attorney, Agent, or Firm* — Chun-Ming Shih; LANWAY IPR SERVICES

(57) ABSTRACT

A hex wrench holder structure includes a tool holder having a first face, a second face, a third face, a fourth face, a fifth face, and a sixth face. The first face is provided with multiple first receiving grooves and multiple first mounting portions aligning with the first receiving grooves respectively. The second face is provided with multiple second receiving grooves. The third face is provided with multiple third receiving grooves. The fourth face is provided with multiple second mounting portions aligning with the second receiving grooves respectively. The fifth face is provided with multiple third mounting portions aligning with the third receiving grooves respectively.

8 Claims, 13 Drawing Sheets

HEX WRENCH HOLDER STRUCTURE

BACKGROUND OF THE INVENTION

1. Field of the Invention

The present invention relates to a tool holder structure and, more particularly, to a hex wrench holder structure.

2. Description of the Related Art

A conventional hex wrench holder structure was disclosed in the U.S. Pat. No. 2,776,744, and comprises a holder 10. The holder 10 includes a base means 11 and a clip cover panel 20.

However, such a conventional hex wrench holder structure has the following disadvantages.

1. Tools are stored in the base means 11 and the clip cover panel 20. The tools at the left side have a specification more than that of the tools at the right side. However, when the user wishes to take out the tools at the right side, it is necessary to rotate the tools at the left side so that the tools at the right side can be removed from the holder 10. For example, when the user wishes to take out the shorter end 38, it is necessary to rotate the shorter end 33, the shorter end 34, the shorter end 35, the shorter end 36, and the shorter end 37, thereby causing inconvenience to the user when needing to operate the tools.
2. Each of the tools has an L-shaped profile. However, each of the tools only has an end fitted with the base means 11 or the clip cover panel 20, so that each of the tools only is not exactly attached to the base means 11 or the clip cover panel 20 and easily detached from the base means 11 or the clip cover panel 20.
3. As shown in FIG. 2, when the user wishes to move the tools upward and take out the tools, a larger contact area is defined between each of the tools and the base means 11 or the clip cover panel 20, so that the user has to apply a larger force to remove each of the tools from the base means 11 or the clip cover panel 20, thereby wasting the user's energy.
4. As shown in FIG. 1, when the base means 11 and the clip cover panel 20 are expanded, the base means 11 and the clip cover panel 20 occupy a larger area, so that the hex wrench holder structure has a larger volume and occupies a larger space.

BRIEF SUMMARY OF THE INVENTION

The primary objective of the present invention is to provide a hex wrench holder structure for storing multiple tools that are mounted on the tool holder independently.

In accordance with the present invention, there is provided a hex wrench holder structure comprising a tool holder. The tool holder has a first face, a second face, a third face, a fourth face, a fifth face, and a sixth face. The first face is formed on a front of the tool holder. The second face and the fourth face are formed on a first side of the tool holder. The third face and the fifth face are formed on a second side of the tool holder. The sixth face is formed on a rear of the tool holder. The first face is provided with multiple first receiving grooves and multiple first mounting portions aligning with the first receiving grooves respectively. The second face is provided with multiple second receiving grooves. The third face is provided with multiple third receiving grooves. The fourth face is provided with multiple second mounting portions aligning with the second receiving grooves respectively. The fifth face is provided with multiple third mounting portions aligning with the third receiving grooves respectively.

The hex wrench holder structure further comprises multiple first tools mounted on the tool holder, multiple second tools mounted on the tool holder, and multiple third tools mounted on the tool holder.

According to the primary advantage of the present invention, each of the first tools, each of the second tools, and each of the third tools are mounted on the tool holder independently, so that when the user wishes to take out the first tools, the second tools or the third tools, each of the first tools, each of the second tools or each of the third tools are directly removed from the tool holder without having to move or rotate other tools. Thus, the first tools, the second tools, and the third tools are directly taken from the tool holder easily, quickly, and conveniently.

BRIEF DESCRIPTION OF THE SEVERAL VIEWS OF THE DRAWING(S)

DETAILED DESCRIPTION OF THE INVENTION

Figure 1:
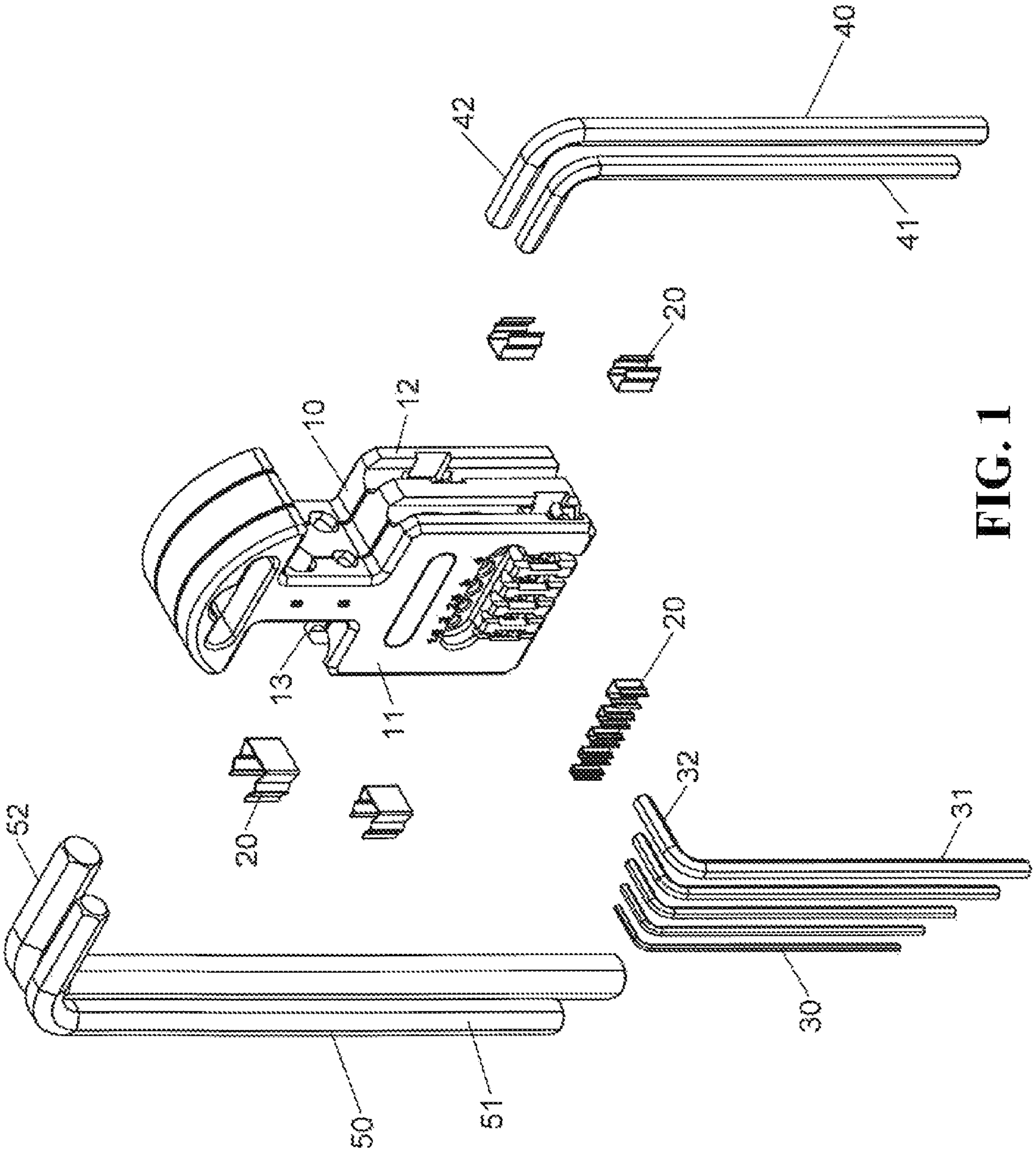
FIG. 1 is an exploded perspective view of a hex wrench holder structure in accordance with the preferred embodiment of the present invention.
Figure 2:
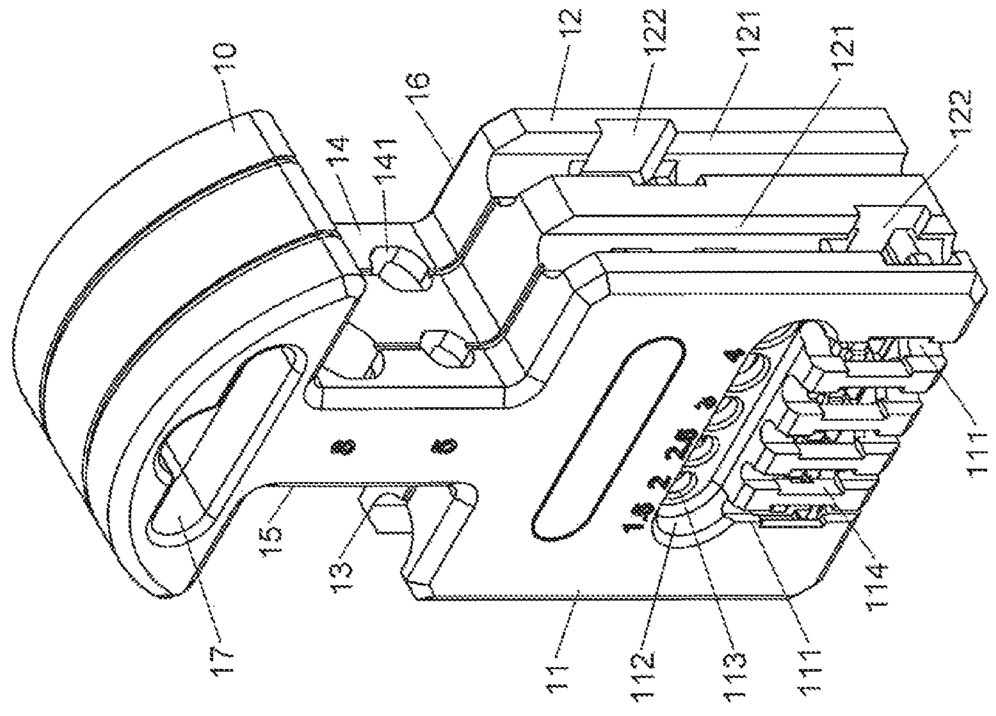
FIG. 2 is a perspective view of a tool holder of the hex wrench holder structure in accordance with the preferred embodiment of the present invention.
Figure 3:
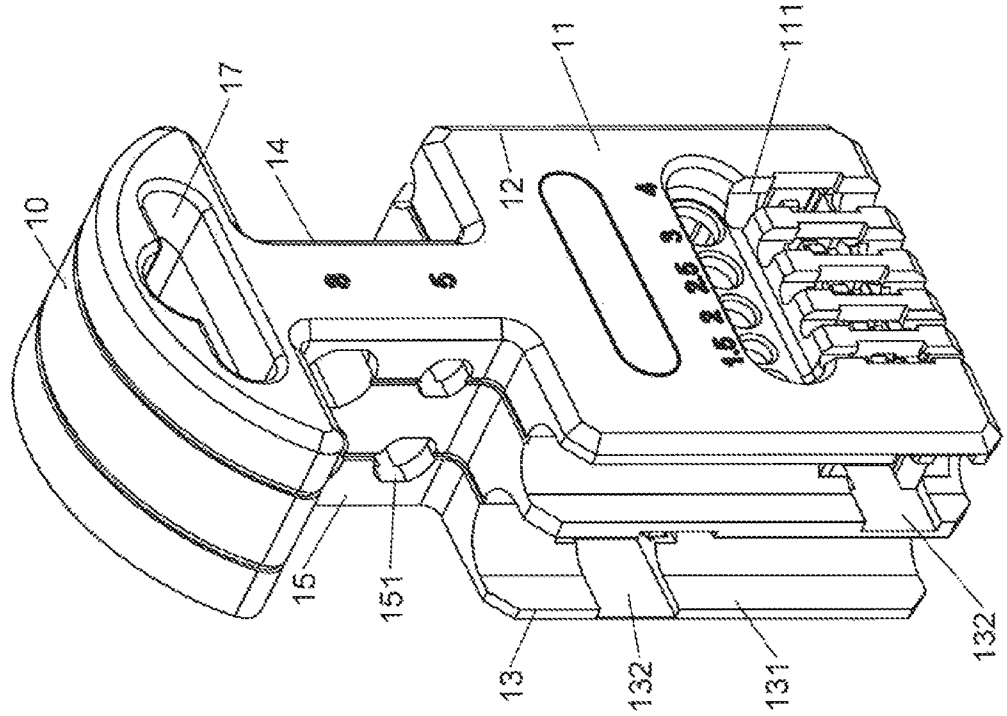
FIG. 3 is another perspective view of the tool holder of the hex wrench holder structure in accordance with the preferred embodiment of the present invention.

Referring to the drawings and initially to FIGS. 1-16, a hex wrench holder structure in accordance with the preferred embodiment of the present invention comprises a tool holder 10.

The tool holder 10 has a first face 11, a second face 12, a third face 13, a fourth face 14, a fifth face 15, and a sixth face 16. The first face 11 is formed on a front of the tool holder 10. The second face 12 and the fourth face 14 are formed on a first side of the tool holder 10. The third face 13 and the fifth face 15 are formed on a second side of the tool holder 10. The sixth face 16 is formed on a rear of the tool holder 10.

The first face 11 is provided with multiple first receiving grooves 111. The first receiving grooves 111 are open in the first face 11. The first face 11 is provided with a receiving space 112. The receiving space 112 is open in the first face 11. The receiving space 112 is connected to each of the first receiving grooves 111. The receiving space 112 has a depth more than that of each of the first receiving grooves 111. The first face 11 is provided with multiple first mounting portions 113. Each of the first mounting portions 113 aligns with one of the first receiving grooves 111 respectively. The first mounting portions 113 are arranged on a bottom of the receiving space 112. Each of the first mounting portions 113 is connected to the receiving space 112. The first face 11 is provided with multiple first receiving recesses 114. Each of the first receiving recesses 114 is connected to one of the first receiving grooves 111 respectively. Each of the first receiving recesses 114 has a width more than that of one of the first receiving grooves 111.

The first receiving grooves 111, the first mounting portions 113, and the first receiving recesses 114 are arranged linearly. The first receiving grooves 111, the first mounting portions 113, and the first receiving recesses 114 have different specifications.

The second face 12 and the third face 13 of the tool holder 10 are arranged symmetrically and are parallel with each other. The fourth face 14 and the fifth face 15 of the tool holder 10 are arranged symmetrically and are parallel with each other. A distance between the second face 12 and the third face 13 is more than that between the fourth face 14 and the fifth face 15. The second face 12 is parallel with the fourth face 14. The third face 13 is parallel with the fifth face 15.

The second face 12 is provided with multiple second receiving grooves 121. The second receiving grooves 121 are open in the second face 12. The second receiving grooves 121 are arranged linearly. The second face 12 is provided with multiple second receiving recesses 122. Each of the second receiving recesses 122 is connected to one of the second receiving grooves 121 respectively. Each of the second receiving recesses 122 is arranged in one of the second receiving grooves 121 respectively. The second receiving recesses 122 misalign with each other.

The second receiving grooves 121 and the second receiving recesses 122 have different specifications.

The third face 13 is provided with multiple third receiving grooves 131. The third receiving grooves 131 are open in the third face 13. The third receiving grooves 131 are arranged linearly. The third face 13 is provided with multiple third receiving recesses 132. Each of the third receiving recesses 132 is connected to one of the third receiving grooves 131 respectively. Each of the third receiving recesses 132 is arranged in one of the third receiving grooves 131 respectively. The third receiving recesses 132 misalign with each other.

The third receiving grooves 131 and the third receiving recesses 132 have different specifications.

The third face 13 has a construction the same as that of the second face 12. The second receiving grooves 121, the second receiving recesses 122, the third receiving grooves 131, and the third receiving recesses 132 have different specifications.

The fourth face 14 is provided with multiple second mounting portions 141. Each of the second mounting portions 141 aligns with one of the second receiving grooves 121 respectively. Each of the second mounting portions 141 penetrates the fourth face 14.

The fifth face 15 is provided with multiple third mounting portions 151. Each of the third mounting portions 151 aligns with one of the third receiving grooves 131 respectively. Each of the third mounting portions 151 penetrates the fifth face 15. Each of the third mounting portions 151 and each of the second mounting portions 141 align from top to bottom.

The fifth face 15 has a construction the same as that of the fourth face 14. The second mounting portions 141 and the third mounting portions 151 have different specifications.

The tool holder 10 is provided with a hanging portion 17 for hanging the tool holder 10 on an object. The hanging portion 17 is arranged on a top of the tool holder 10. The hanging portion 17 is a perforation.

Figure 4:
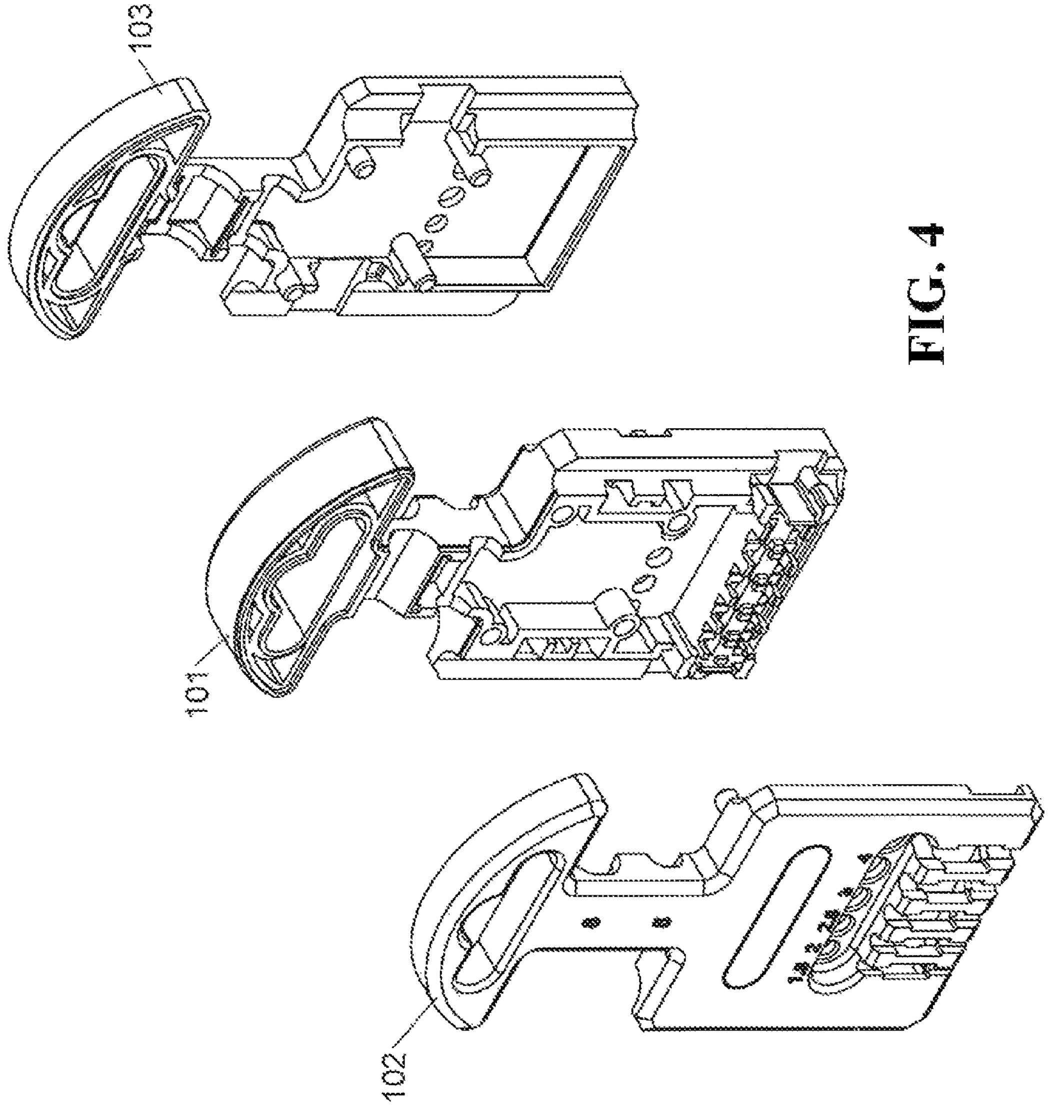
FIG. 4 is an exploded perspective view of the tool holder of the hex wrench holder structure in accordance with the preferred embodiment of the present invention.

The tool holder 10 is an integrally formed structure or includes a first body 101, a second body 102, and a third body 103 as shown in FIG. 4. The first body 101 is located between the second body 102 and the third body 103. The first body 101, the second body 102, and the third body 103 are assembled together. The first body 101, the second body 102, and the third body 103 are divided by the second receiving grooves 121 and the third receiving grooves 131 of the tool holder 10.

Figure 6:
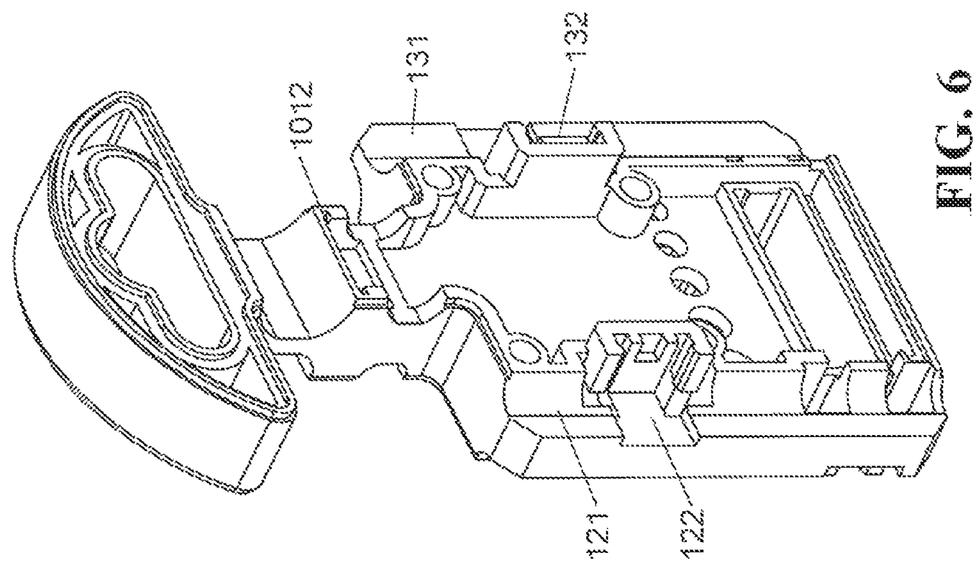
FIG. 6 is another perspective view of the first body of the hex wrench holder structure in accordance with the preferred embodiment of the present invention.
Figure 5:
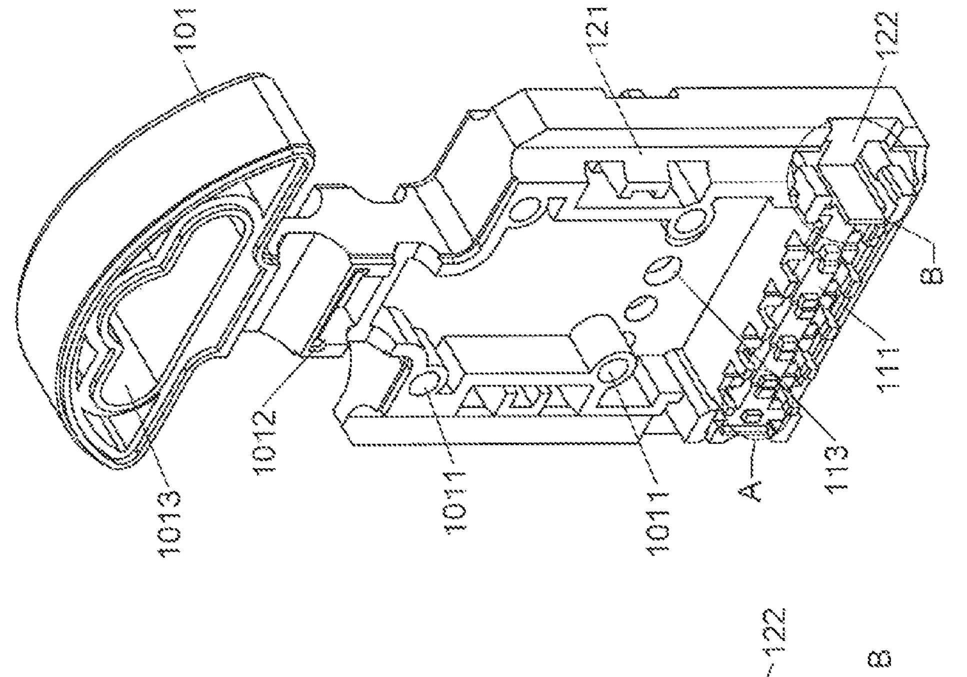
FIG. 5 is a perspective view of a first body of the hex wrench holder structure in accordance with the preferred embodiment of the present invention.

The first body 101 has a front and a back each provided with multiple first fitting grooves 1011 as shown in FIGS. 5 and 6. The first fitting grooves 1011 on the front and the back of the first body 101 are arranged symmetrically. Each of the first fitting grooves 1011 has a circular shape. Each of the front and the back of the first body 101 is provided with a second fitting groove 1012. The second fitting grooves 1012 on the front and the back of the first body 101 are arranged symmetrically. The first body 101 is provided with a first slot

1013. The second fitting groove 1012 is arranged between the first fitting grooves 1011 and the first slot 1013. The first slot 1013 is a perforation.

Figure 10:
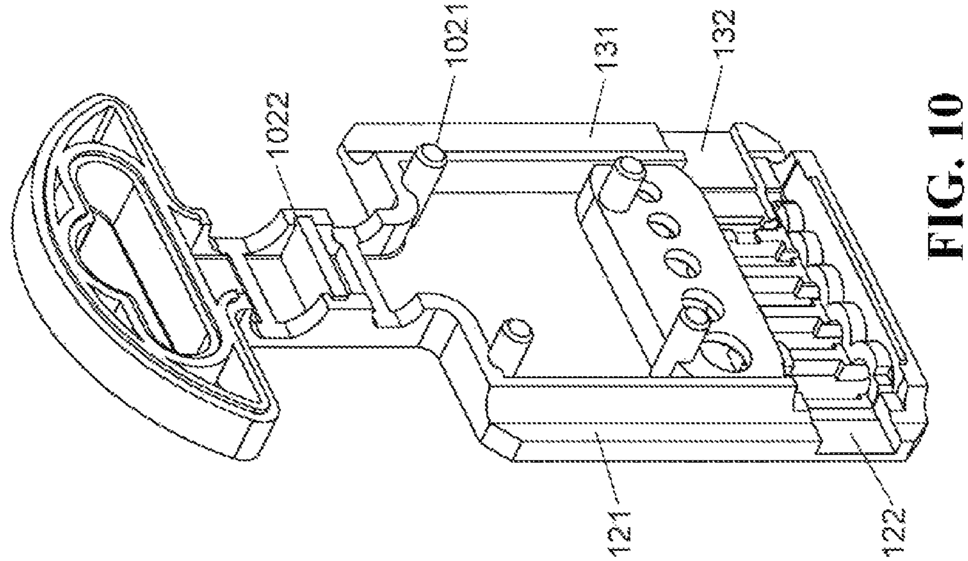
FIG. 10 is another perspective view of the second body of the hex wrench holder structure in accordance with the preferred embodiment of the present invention.
Figure 9:
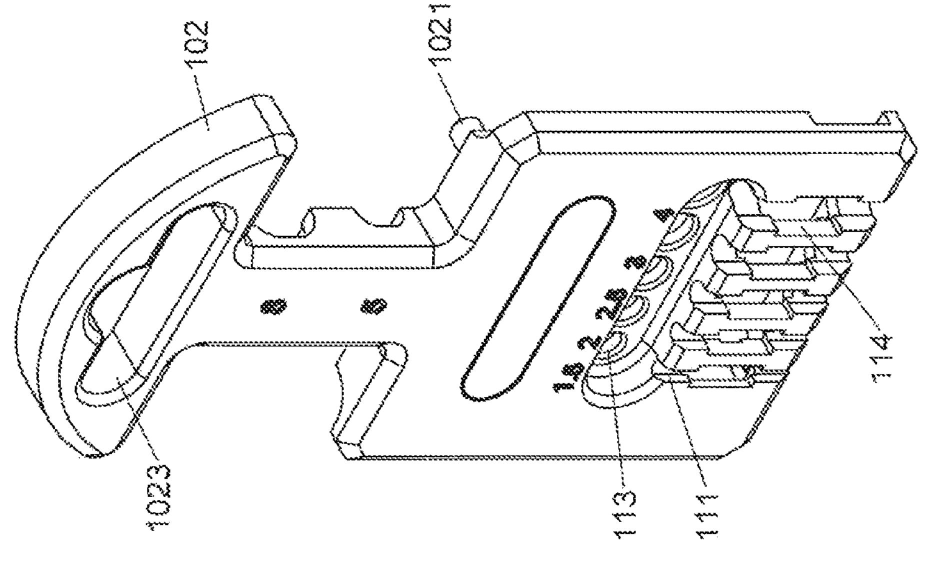
FIG. 9 is a perspective view of a second body of the hex wrench holder structure in accordance with the preferred embodiment of the present invention.

The first face 11 is provided on the second body 102. The second body 102 is assembled with the first body 101. The second body 102 is provided with multiple protruding first fitting portions 1021 as shown in FIG. 10. The first fitting portions 1021 are assembled with the first fitting grooves 1011. Each of the first fitting portions 1021 is a cylinder. The second body 102 is provided with a second fitting portion 1022 as shown in FIG. 10. The second fitting portion 1022 is assembled with the second fitting groove 1012. The second fitting portion 1022 is a protruding block. The second body 102 is provided with a second slot 1023 close to the top of the second body 102 as shown in FIG. 9. The second slot 1023 aligns with the first slot 1013. The second slot 1023 is a perforation.

Figure 11:
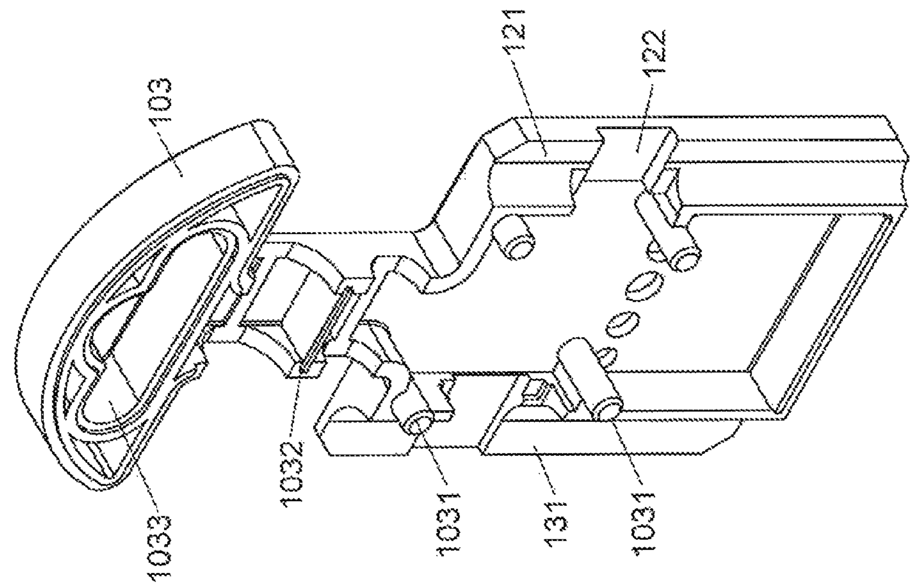
FIG. 11 is a perspective view of a third body of the hex wrench holder structure in accordance with the preferred embodiment of the present invention.
Figure 12:
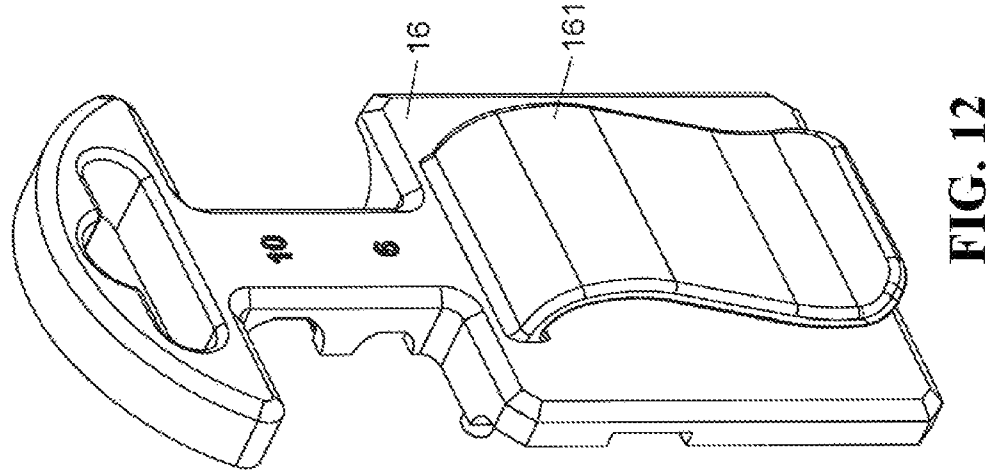
FIG. 12 is another perspective view of the third body of the hex wrench holder structure in accordance with the preferred embodiment of the present invention.

The sixth face 16 is provided on the third body 103 as shown in FIG. 12. The third body 103 is assembled with the first body 101. The third body 103 is provided with multiple protruding third fitting portions 1031 as shown in FIG. 11. The third fitting portions 1031 are assembled with the first fitting grooves 1011. Each of the third fitting portions 1031 is a cylinder. The third body 103 is provided with a fourth fitting portion 1032 as shown in FIG. 11. The fourth fitting portion 1032 is assembled with the second fitting groove 1012. The fourth fitting portion 1032 is a protruding block. The third body 103 is provided with a third slot 1033 close to the top of the third body 103 as shown in FIG. 11. The third slot 1033 aligns with the first slot 1013. The third slot 1033 is a perforation.

The first slot 1013, the second slot 1023, and the third slot 1033 construct the hanging portion 17.

In the preferred embodiment of the present invention, each of the first receiving grooves 111 has an arcuate shape. The receiving space 112 is an elongate slot. Each of the first mounting portions 113 has a circular shape.

In the preferred embodiment of the present invention, the first face 11 is provided with at least three first receiving grooves 111, at least three first mounting portions 113, and at least three first receiving recesses 114. The second face 12 is provided with at least two second receiving grooves 121 and at least two second receiving recesses 122. The third face 13 is provided with at least two third receiving grooves 131 and at least two third receiving recesses 132.

In the preferred embodiment of the present invention, each of the second receiving grooves 121 has an arcuate shape, and each of the third receiving grooves 131 has an arcuate shape.

In the preferred embodiment of the present invention, each of the second mounting portions 141 has a hexagonal or circular shape, and each of the third mounting portions 151 has a hexagonal or circular shape.

In the preferred embodiment of the present invention, the sixth face 16 is parallel with the first face 11. The second face 12 and the third face 13 are arranged between the first face 11 and the sixth face 16. As shown in FIG. 12, the sixth face 16 is provided with a hooked portion 161 for hooking the tool holder 10 onto an object.

Figure 7:
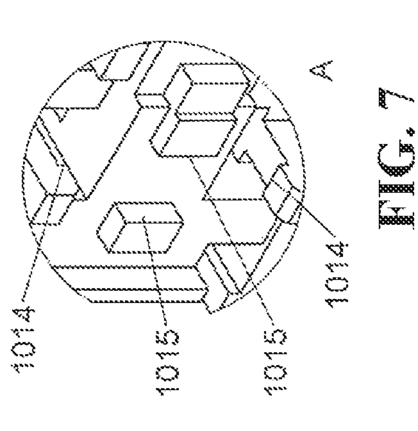
FIG. 7 is a locally enlarged view of the first body taken along a circular mark "A" as shown in FIG. 5.
Figure 8:
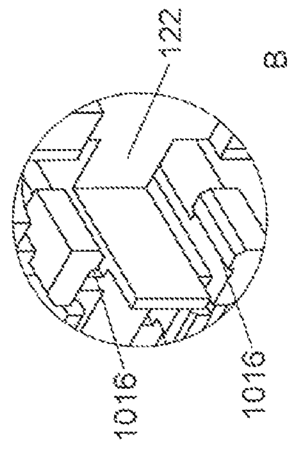
FIG. 8 is a locally enlarged view of the first body taken along a circular mark "B" as shown in FIG. 5.

In the preferred embodiment of the present invention, the front of the first body 101 is provided with multiple first locking portions 1014 close to the bottom of the first body 101 as shown in FIG. 7. Each of the first locking portions 1014 is hook-shaped. The front of the first body 101 is provided with multiple first abutting portions 1015 close to the bottom of the first body 101 as shown in FIG. 7. Each of the first abutting portions 1015 has a planar shape. The first abutting portions 1015 are arranged between the first locking portions 1014. The first locking portions 1014 and the first abutting portions 1015 are directed toward the first face 11. The first locking portions 1014 and the first abutting portions 1015 are arranged in the first receiving recesses 114. The first body 101 has two sides each provided with multiple second locking portions 1016 as shown in FIG. 8. Each of the second locking portions 1016 is hook-shaped. The second locking portions 1016 are partially arranged in the second receiving recesses 122. The second locking portions 1016 are partially directed toward the second face 12. The second locking portions 1016 are partially arranged in the third receiving recesses 132. The second locking portions 1016 are partially directed toward the third face 13.

Figure 13:
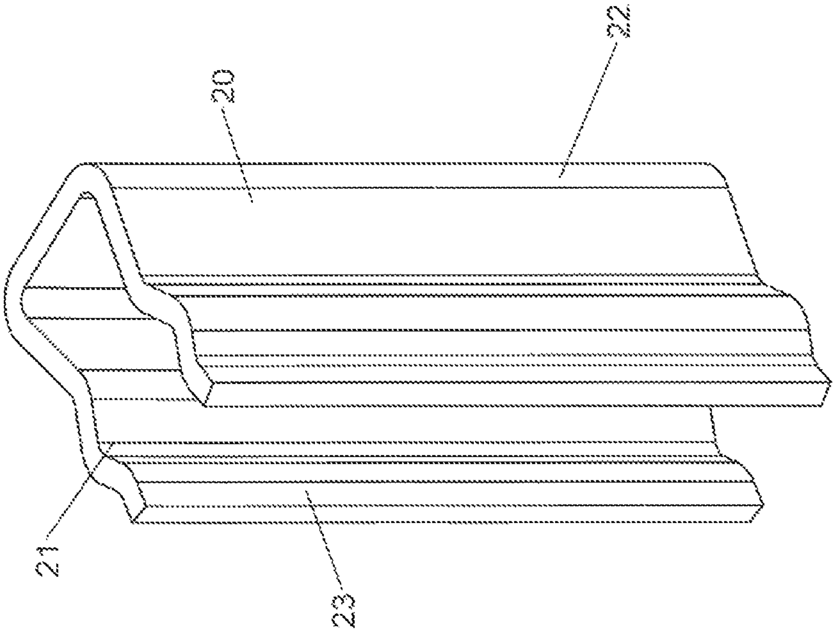
FIG. 13 is a perspective view of an elastic plate of the hex wrench holder structure in accordance with the preferred embodiment of the present invention.

The hex wrench holder structure further comprises multiple elastic plates 20 mounted in the first receiving recesses 114, the second receiving recesses 122, and the third receiving recesses 132. The elastic plates 20 in the first receiving recesses 114 are locked by the first locking portions 1014. The elastic plates 20 in the second receiving recesses 122 and the third receiving recesses 132 are locked by the second locking portions 1016. Each of the elastic plates 20 has an interior provided with two abutting faces 21 as shown in FIG. 13. Each of the two abutting faces 21 is a connection of two angles. Each of the elastic plates 20 has an exterior provided with two second abutting portions 22 resting on the first abutting portions 1015 respectively. Each of the elastic plates 20 is provided with two oblique faces 23 close to an opening of each of the elastic plates 20. The two oblique faces 23 extend outward.

Figure 14:
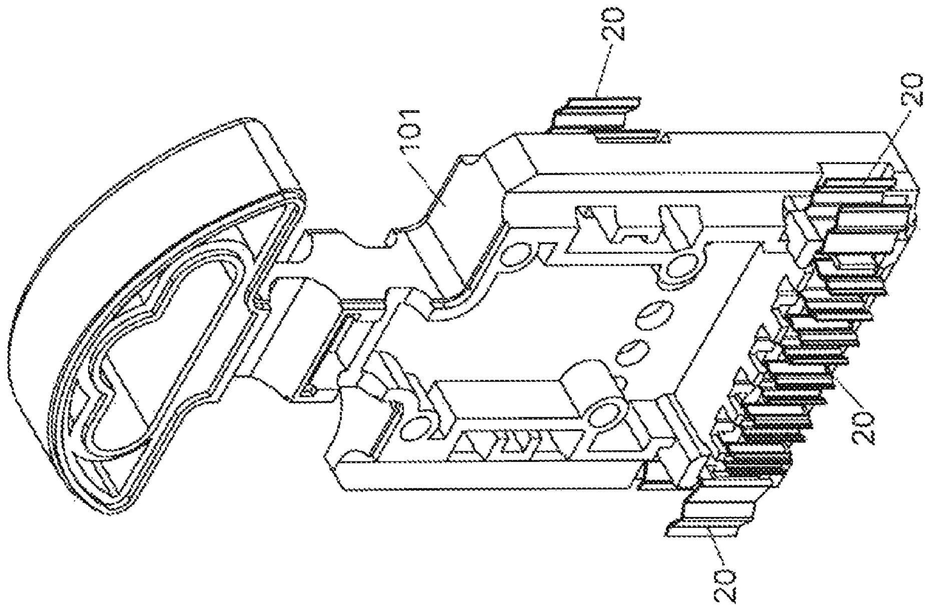
FIG. 14 is a partial perspective assembly view of the hex wrench holder structure in accordance with the preferred embodiment of the present invention.

As shown in FIG. 14, the elastic plates 20 are assembled with the first body 101.

In the preferred embodiment of the present invention, the hex wrench holder structure further comprises multiple first tools 30, multiple second tools 40, and multiple third tools 50.

The first tools 30 are hex wrenches with different specifications. Each of the first tools 30 has a first end provided with a first received section 31 and a second end provided with a first fitted section 32. The first received section 31 is received in one of the first receiving grooves 111 and secured by one of the elastic plates 20. The first received section 31 rests on the two abutting faces 21 of one of the elastic plates 20. The first fitted section 32 is received in the receiving space 112 and mounted in one of the first mounting portions 113. The first tools 30 are restricted by the first mounting portions 113 and the elastic plates 20 and are not detached from the tool holder 10 easily.

The second tools 40 are hex wrenches with different specifications. Each of the second tools 40 has a first end provided with a second received section 41 and a second end provided with a second fitted section 42. The second received section 41 is received in one of the second receiving grooves 121 and secured by one of the elastic plates 20. The second received section 41 rests on the two abutting faces 21 of one of the elastic plates 20. The second fitted section 42 is mounted in one of the second mounting portions 141. The second tools 40 are restricted by the second mounting portions 141 and the elastic plates 20 and are not detached from the tool holder 10 easily.

The third tools 50 are hex wrenches with different specifications. Each of the third tools 50 has a first end provided with a third received section 51 and a second end provided with a third fitted section 52. The third received section 51 is received in one of the third receiving grooves 131 and secured by one of the elastic plates 20. The third received section 51 rests on the two abutting faces 21 of one of the elastic plates 20. The third fitted section 52 is mounted in one of the third mounting portions 151. The third tools 50 are restricted by the third mounting portions 151 and the elastic plates 20 and are not detached from the tool holder 10 easily.

The two abutting faces 21 of each of the elastic plates 20 match a cross-sectional hexagonal shape of the first received section 31 of one of the first tools 30, the second received section 41 of one of the second tools 40, and the third received section 51 of one of the third tools 50. The two abutting faces 21 of each of the elastic plates 20 clamp the first received section 31 of one of the first tools 30, the second received section 41 of one of the second tools 40, and the third received section 51 of one of the third tools 50.

Figure 15:
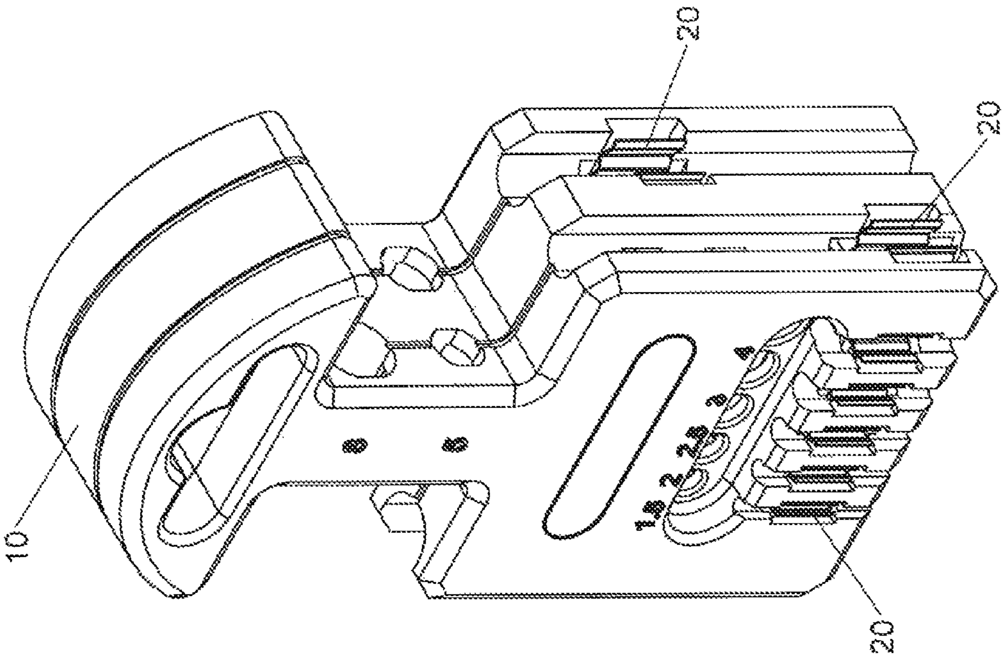
FIG. 15 is another partial perspective assembly view of the hex wrench holder structure in accordance with the preferred embodiment of the present invention.
Figure 16:
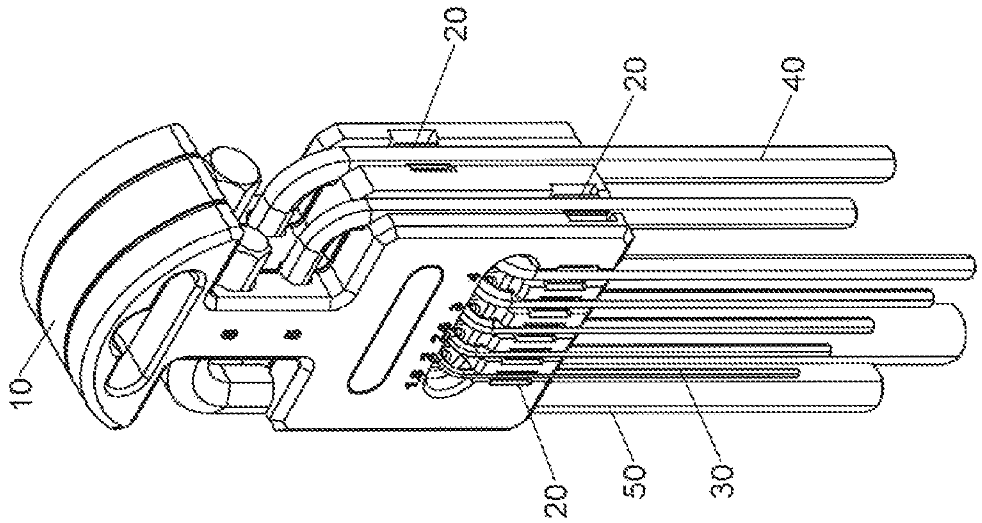
FIG. 16 is a perspective assembly view of the hex wrench holder structure in accordance with the preferred embodiment of the present invention.

In assembly, referring to FIGS. 15 and 16 with reference to FIGS. 1-14, the elastic plates 20 and the tool holder 10 are assembled as shown in FIG. 15. The elastic plates 20 are respectively received in the first receiving recesses 114, the second receiving recesses 122, and the third receiving recesses 132. The first received section 31 is received in one of the first receiving grooves 111 and secured by one of the elastic plates 20, and the first fitted section 32 is mounted in one of the first mounting portions 113. The second received section 41 is received in one of the second receiving grooves 121 and secured by one of the elastic plates 20, and the second fitted section 42 is mounted in one of the second mounting portions 141. The third received section 51 is received in one of the third receiving grooves 131 and secured by one of the elastic plates 20, and the third fitted section 52 is mounted in one of the third mounting portions 151.

Figure 17:
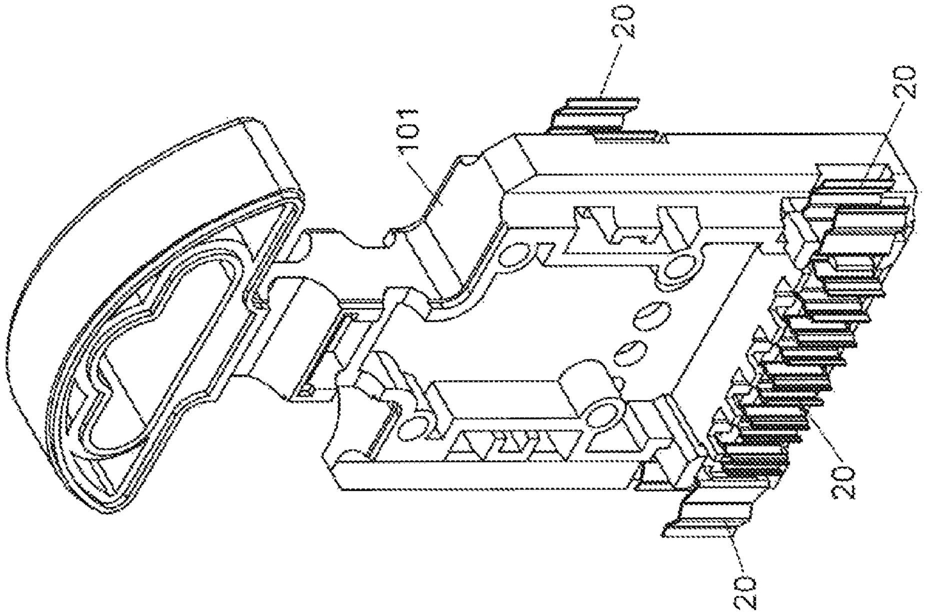
FIG. 17 is a partial perspective assembly view of the hex wrench holder structure in accordance with the second preferred embodiment of the present invention.
Figure 19:
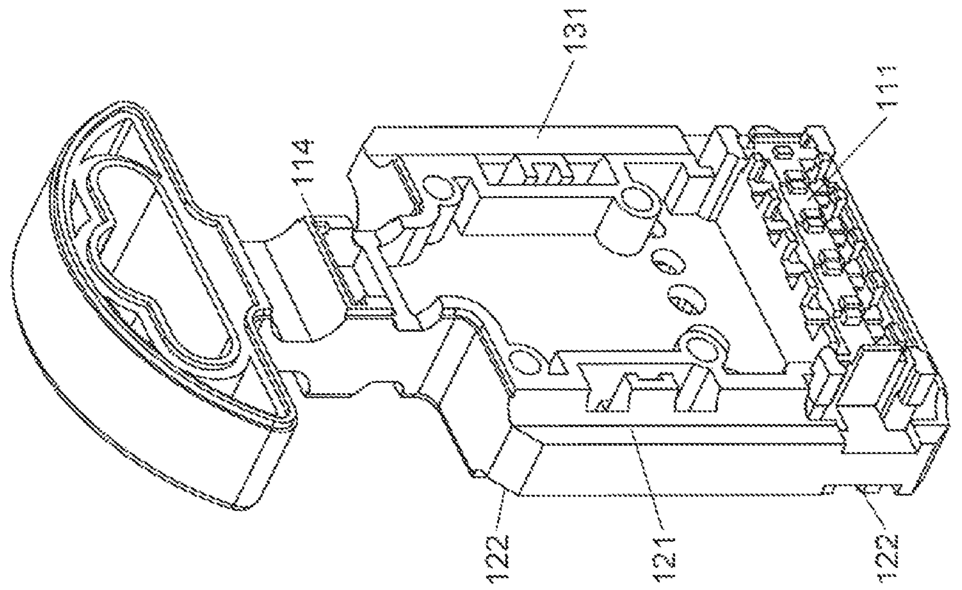
FIG. 19 is another perspective view of the first body of the hex wrench holder structure in accordance with the third preferred embodiment of the present invention.
Figure 18:
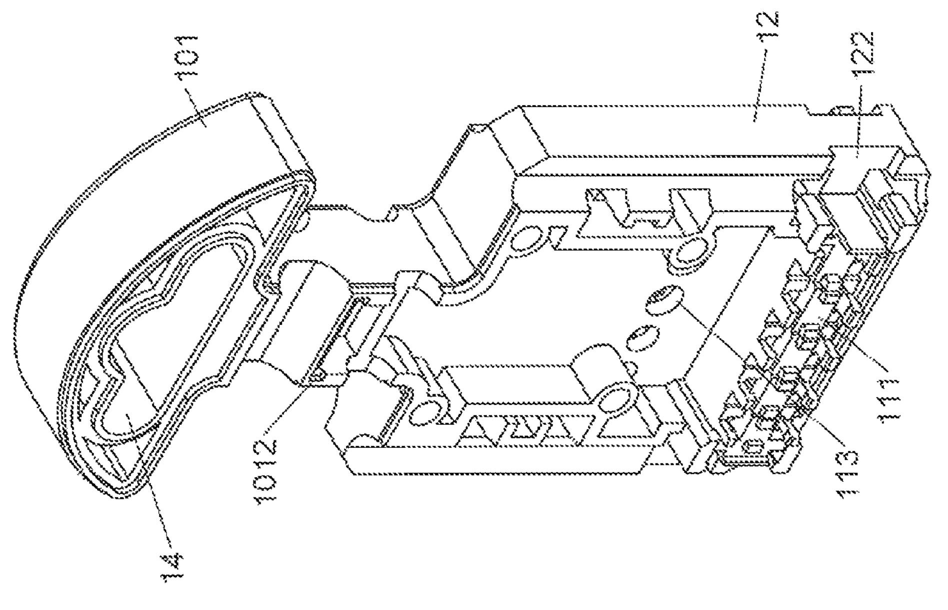
FIG. 18 is a perspective view of a first body of the hex wrench holder structure in accordance with the third preferred embodiment of the present invention.
Figure 21:
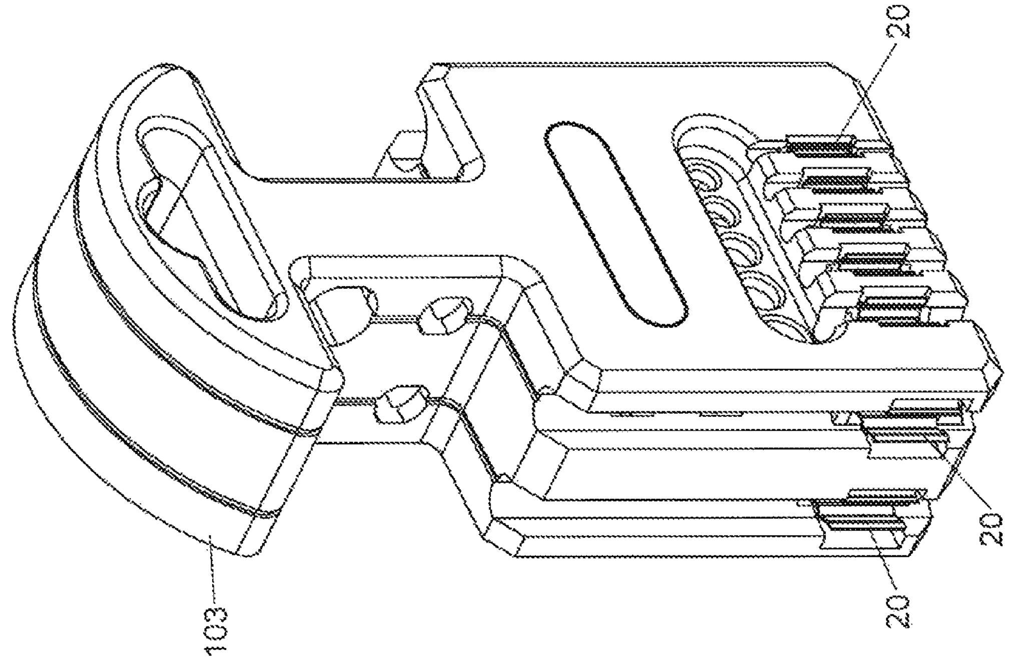
FIG. 21 is another partial perspective assembly view of the hex wrench holder structure in accordance with the third preferred embodiment of the present invention.
Figure 20:
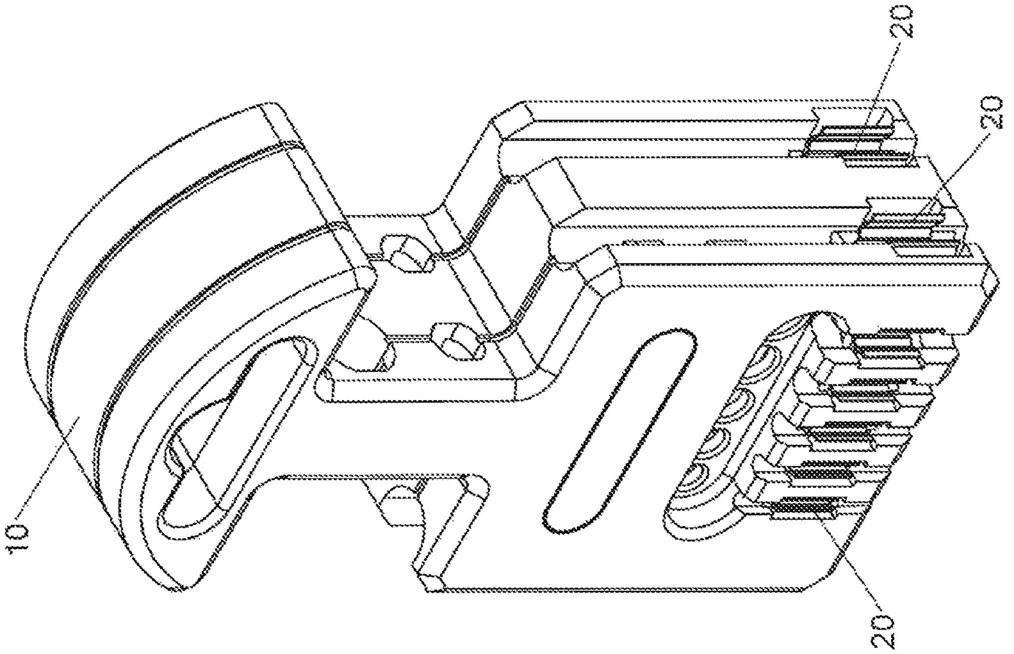
FIG. 20 is a partial perspective assembly view of the hex wrench holder structure in accordance with the third preferred embodiment of the present invention.

Referring to FIG. 17, the first body 101 is directly formed with the elastic plates 20 so that the elastic plates 20 and the tool holder 10 are formed integrally.

Referring to FIGS. 18-21, the front and the back of the first body 101 have the same structure, and the second body 102 and the third body 103 have the same structure. The hooked portion 161 of the sixth face 16 is undefined. The sixth face 16 is also provided with the first receiving grooves 111, the receiving space 112, the first mounting portions 113, and the first receiving recesses 114.

Accordingly, the hex wrench holder structure has the following advantages.

1. Each of the first tools 30, each of the second tools 40, and each of the third tools 50 are mounted on the tool holder 10 independently, so that when the user wishes to take out the first tools 30, the second tools 40 or the third tools 50, each of the first tools 30, each of the second tools 40 or each of the third tools 50 are directly removed from the tool holder 10 without having to move or rotate other tools. Thus, the first tools 30, the second tools 40, and the third tools 50 are directly taken from the tool holder 10 easily, quickly, and conveniently.
2. The first received section 31, the first fitted section 32, the second received section 41, the second fitted section 42, the third received section 51, and the third fitted section 52 are fitted on the tool holder 10, so that each of the first tools 30, each of the second tools 40, and each of the third tools 50 have two parts assembled with the tool holder 10. Thus, the first tools 30, the second tools 40, and the third tools 50 are attached to the tool holder 10 steadily and will not be detached from the tool holder 10 easily.
3. The first receiving grooves 111, the second receiving grooves 121, and the third receiving grooves 131 are provided on the first face 11, the second face 12, and the third face 13 respectively, to receive the first tools 30, the second tools 40, and the third tools 50, so that the tool holder 10 has at least three faces for mounting the first tools 30, the second tools 40, and the third tools 50 of different specifications. Thus, the tool holder 10 is used to store more tools of different specifications under the minimum volume.
4. When the user wishes to remove the first tools 30, the second tools 40 or the third tools 50 from the tool holder 10, the first received section 31 is detached from one of the first receiving grooves 111 and one of the elastic plates 20, the second received section 41 is detached from one of the second receiving grooves 121 and one of the elastic plates 20, or the third received section 51 is detached from one of the third receiving grooves 131 and one of the elastic plates 20, while the first fitted section 32 is detached from one of the first mounting portions 113, the second fitted section 42 is detached from one of the second mounting portions 141 or and the third fitted section 52 is detached from one of the third mounting portions 151, so that the first tools 30, the second tools 40 or the third tools 50 are removed from the tool holder 10 quickly.
5. The first received section 31 is received in one of the first receiving grooves 111 and secured by one of the elastic plates 20, and the first fitted section 32 is mounted in one of the first mounting portions 113, so that the first tools 30 are restricted by the first mounting portions 113 and the elastic plates 20 and are not detached from the tool holder 10 easily. The second received section 41 is received in one of the second receiving grooves 121 and secured by one of the elastic plates 20, and the second fitted section 42 is mounted in one of the second mounting portions 141, so that the second tools 40 are restricted by the second mounting portions 141 and the elastic plates 20 and are not detached from the tool holder 10 easily. The third received section 51 is received in one of the third receiving grooves 131 and secured by one of the elastic plates 20, and the third fitted section 52 is mounted in one of the third mounting portions 151, so that the third tools 50 are restricted by the third mounting portions 151 and the elastic plates 20 and are not detached from the tool holder 10 easily.
6. The tool holder 10 is an integrally formed structure or includes a first body 101, a second body 102, and a third body 103. When the front and the back of the first body 101 have the same structure, the second body 102 and the third body 103 have the same structure. Alternatively, when the front and the back of the first body 101 have different structures, the second body 102 and the third body 103 have different structures.

The invention claimed is:

1. A hex wrench holder structure comprising:

a tool holder;

wherein:

the tool holder has a first face, a second face, a third face, a fourth face, a fifth face, and a sixth face;

the first face is formed on a front of the tool holder;

the second face and the fourth face are formed on a first side of the tool holder;

the third face and the fifth face are formed on a second side of the tool holder;

the sixth face is formed on a rear of the tool holder;

the first face is provided with multiple first receiving grooves;

the first receiving grooves are open in the first face;

the first face is provided with a receiving space;
the receiving space is open in the first face;
the receiving space is connected to each of the first receiving grooves;
the receiving space has a depth more than that of each of the first receiving grooves;
the first face is provided with multiple first mounting portions;
each of the first mounting portions aligns with one of the first receiving grooves respectively;
the first mounting portions are arranged on a bottom of the receiving space;
each of the first mounting portions is connected to the receiving space;
the first face is provided with multiple first receiving recesses;
each of the first receiving recesses is connected to one of the first receiving grooves respectively;
each of the first receiving recesses has a width more than that of one of the first receiving grooves;
the first receiving grooves, the first mounting portions, and the first receiving recesses are arranged linearly;
the second face and the third face of the tool holder are parallel with each other;
the fourth face and the fifth face of the tool holder are parallel with each other;
a distance between the second face and the third face is more than that between the fourth face and the fifth face;
the second face is parallel with the fourth face;
the third face is parallel with the fifth face;
the second face is provided with multiple second receiving grooves;
the second receiving grooves are open in the second face;
the second receiving grooves are arranged linearly;
the second face is provided with multiple second receiving recesses;
each of the second receiving recesses is connected to one of the second receiving grooves respectively;
each of the second receiving recesses is arranged in one of the second receiving grooves respectively;
the second receiving recesses misalign with each other;
the third face is provided with multiple third receiving grooves;
the third receiving grooves are open in the third face;
the third receiving grooves are arranged linearly;
the third face is provided with multiple third receiving recesses;
each of the third receiving recesses is connected to one of the third receiving grooves respectively;
each of the third receiving recesses is arranged in one of the third receiving grooves respectively;
the third receiving recesses misalign with each other;
the third face has a construction the same as that of the second face;
the fourth face is provided with multiple second mounting portions;
each of the second mounting portions aligns with one of the second receiving grooves respectively;
each of the second mounting portions penetrates the fourth face;
the fifth face is provided with multiple third mounting portions;
each of the third mounting portions aligns with one of the third receiving grooves respectively;
each of the third mounting portions penetrates the fifth face;
the fifth face has a construction the same as that of the fourth face;
the tool holder is provided with a hanging portion;
the hanging portion is arranged on a top of the tool holder;
the hanging portion is a perforation;
the tool holder is an integrally formed structure or includes a first body, a second body, and a third body;
the first body is located between the second body and the third body;
the first body, the second body, and the third body are assembled together;
the first body, the second body, and the third body are divided by the second receiving grooves and the third receiving grooves of the tool holder;
the first body has a front and a back each provided with multiple first fitting grooves;
each of the first fitting grooves has a circular shape;
each of the front and the back of the first body is provided with a second fitting groove;
the first body is provided with a first slot;
the second fitting groove is arranged between the first fitting grooves and the first slot;
the first slot is a perforation;
the first face is provided on the second body;
the second body is assembled with the first body;
the second body is provided with multiple protruding first fitting portions;
the first fitting portions are assembled with the first fitting grooves;
each of the first fitting portions is a cylinder;
the second body is provided with a second fitting portion;
the second fitting portion is assembled with the second fitting groove;
the second fitting portion is a protruding block;
the second body is provided with a second slot close to the top of the second body;
the second slot aligns with the first slot;
the second slot is a perforation;
the sixth face is provided on the third body;
the third body is assembled with the first body;
the third body is provided with multiple protruding third fitting portions;
the third fitting portions are assembled with the first fitting grooves;
each of the third fitting portions is a cylinder;
the third body is provided with a fourth fitting portion;
the fourth fitting portion is assembled with the second fitting groove;
the fourth fitting portion is a protruding block;
the third body is provided with a third slot close to the top of the third body;
the third slot aligns with the first slot;
the third slot is a perforation; and
the first slot, the second slot, and the third slot construct the hanging portion.

2. The hex wrench holder structure as claimed in claim 1, wherein each of the first receiving grooves has an arcuate shape, the receiving space is an elongate slot, and each of the first mounting portions has a circular shape.

3. The hex wrench holder structure as claimed in claim 1, wherein the first face is provided with at least three first receiving grooves, at least three first mounting portions, and at least three first receiving recesses, the second face is provided with at least two second receiving grooves and at least two second receiving recesses, and the third face is provided with at least two third receiving grooves and at least two third receiving recesses.

4. The hex wrench holder structure as claimed in claim 1, wherein each of the second receiving grooves has an arcuate shape, and each of the third receiving grooves has an arcuate shape.

5. The hex wrench holder structure as claimed in claim 1, wherein each of the second mounting portions has a hexagonal or circular shape, and each of the third mounting portions has a hexagonal or circular shape.

6. The hex wrench holder structure as claimed in claim 1, wherein the sixth face is parallel with the first face, the second face and the third face are arranged between the first face and the sixth face, and the sixth face is provided with a hooked portion.

7. The hex wrench holder structure as claimed in claim 1, wherein:

the front of the first body is provided with multiple first locking portions;

each of the first locking portions is hook-shaped;

the front of the first body is provided with multiple first abutting portions;

each of the first abutting portions has a planar shape;

the first abutting portions are arranged between the first locking portions;

the first locking portions and the first abutting portions are directed toward the first face;

the first locking portions and the first abutting portions are arranged in the first receiving recesses;

the first body has two sides each provided with multiple second locking portions;

each of the second locking portions is hook-shaped;

the second locking portions are partially arranged in the second receiving recesses;

the second locking portions are partially directed toward the second face;

the second locking portions are partially arranged in the third receiving recesses;

the second locking portions are partially directed toward the third face;

the hex wrench holder structure further comprises multiple elastic plates mounted in the first receiving recesses, the second receiving recesses, and the third receiving recesses;

the elastic plates in the first receiving recesses are locked by the first locking portions;

the elastic plates in the second receiving recesses and the third receiving recesses are locked by the second locking portions;

each of the elastic plates has an interior provided with two abutting faces;

each of the two abutting faces is a connection of two angles;

each of the elastic plates has an exterior provided with two second abutting portions resting on the first abutting portions respectively;

each of the elastic plates is provided with two oblique faces close to an opening of each of the elastic plates; and the two oblique faces extend outward.

8. The hex wrench holder structure as claimed in claim 7, further comprising:

multiple first tools, multiple second tools, and multiple third tools;

wherein:

each of the first tools has a first end provided with a first received section and a second end provided with a first fitted section;

the first received section is received in one of the first receiving grooves and secured by one of the elastic plates;

the first received section rests on the two abutting faces of one of the elastic plates;

the first fitted section is received in the receiving space and mounted in one of the first mounting portions;

the first tools are restricted by the first mounting portions and the elastic plates and are not detached from the tool holder easily;

each of the second tools has a first end provided with a second received section and a second end provided with a second fitted section;

the second received section is received in one of the second receiving grooves and secured by one of the elastic plates;

the second received section rests on the two abutting faces of one of the elastic plates;

the second fitted section is mounted in one of the second mounting portions;

the second tools are restricted by the second mounting portions and the elastic plates and are not detached from the tool holder easily;

each of the third tools has a first end provided with a third received section and a second end provided with a third fitted section;

the third received section is received in one of the third receiving grooves and secured by one of the elastic plates;

the third received section rests on the two abutting faces of one of the elastic plates;

the third fitted section is mounted in one of the third mounting portions;

the third tools are restricted by the third mounting portions and the elastic plates and are not detached from the tool holder easily;

the two abutting faces of each of the elastic plates match a cross-sectional hexagonal shape of the first received section of one of the first tools, the second received section of one of the second tools, and the third received section of one of the third tools; and the two abutting faces of each of the elastic plates clamp the first received section of one of the first tools, the second received section of one of the second tools, and the third received section of one of the third tools.

* * * * *